United States Patent [19]
Kim

[11] Patent Number: 6,006,969
[45] Date of Patent: Dec. 28, 1999

[54] BELT HOLDER FOR PORTABLE PHONES

[76] Inventor: Dong-Joo Kim, Joong-Ang Spring 192-30, Haengdang, Seongdong-ku, Seoul 133-070, Rep. of Korea

[21] Appl. No.: 09/250,141

[22] Filed: Feb. 16, 1999

[30] Foreign Application Priority Data

Jun. 12, 1998 [KR] Rep. of Korea ............... 98-10032

[51] Int. Cl.⁶ .................................................. A45F 5/00
[52] U.S. Cl. ...................... 224/197; 224/272; 224/901; 224/930
[58] Field of Search ................................. 224/197, 199, 224/271, 272, 930, 666, 269, 901; 24/3.11, 3.12, 595, 594, 597

[56] References Cited

U.S. PATENT DOCUMENTS

| | | | |
|---|---|---|---|
| 5,622,296 | 4/1997 | Pirhonen et al. | 224/197 |
| 5,730,342 | 3/1998 | Tien | 224/271 |
| 5,779,115 | 7/1998 | Parkas et al. | 224/272 |
| 5,850,996 | 12/1998 | Liang | 224/197 |

*Primary Examiner*—Linda J. Sholl
*Attorney, Agent, or Firm*—Levine & Mandelbaum

[57] ABSTRACT

A belt holder for portable phones is disclosed. In the holder, the cover plate has a horizontal guide opening at its middle portion, with a guide channel being formed at the top center of the cover plate. A clip plate is assembled with the cover plate into a housing of the holder. A locker is vertically and movably set in the holder at a position between the cover and clip plates so as to be vertically movable in the gap between the two plates. The locker has two inclined guide portions at both side edges with the two inclined guide portions being converged downwardly. Two locking pieces are symmetrically and movably seated in the horizontal guide opening of the cover plate. The two locking pieces cooperate with both the locking button of a portable phone at their first slope surfaces and the inclined guide portions of the locker at their second slope surfaces. A coil spring is positioned between the side wall of the cover plate and each of the two locking pieces, thus normally biasing the two locking pieces to each other.

1 Claim, 6 Drawing Sheets

BELT HOLDER FOR PORTABLE PHONES

BACKGROUND OF THE INVENTION

1. Field of the Invention

The present invention relates, in general, to means for allowing a user to carry a portable phone on his body while out of the home or office and, more particularly, to a belt holder used for holding a portable phone on a waist belt, the holder being designed to have a simple construction and safely hold a portable phone.

2. Description of the Prior Art

Portable phones, such as cellular phones or PCS phones developed in accordance with the growth of information and communication industry, are widely and generally used by people in recent years. Such portable phones have been provided with multi-functions capable of satisfying consumers' desires and this makes the portable phones somewhat expensive.

Most users want to safely and easily carry such expensive portable phones without having any fear of losing them while out of the home or office. In an effort to meet such desire of users, several types of belt holders are proposed to allow the users to carry the portable phone on their waist belts.

Figure 1:
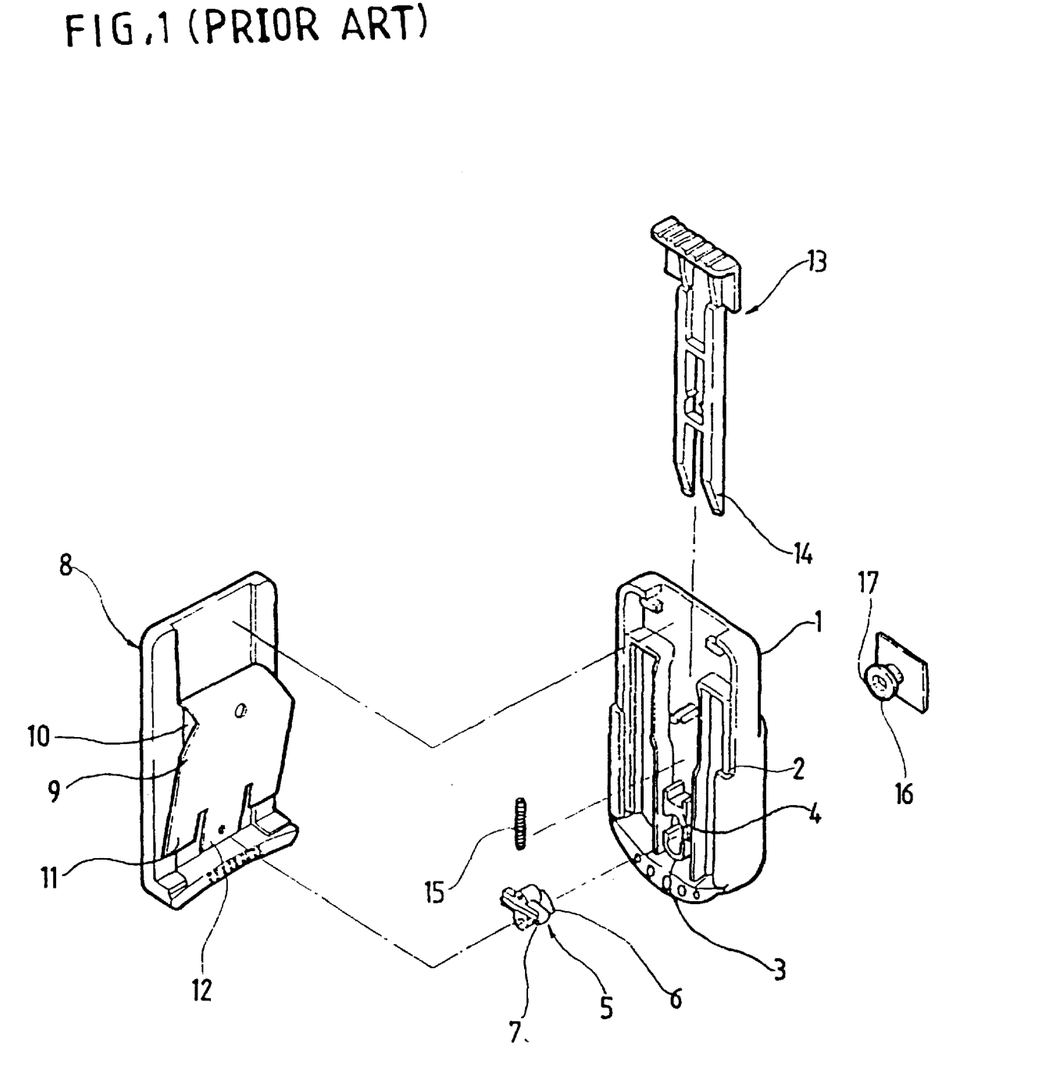
FIG. 1 is an exploded perspective view, showing the construction of a typical belt holder for portable phones.

FIG. 1 shows the construction of a typical belt holder for portable phones.

As shown in the drawing, the typical holder for portable phones comprises a cover plate 1, a locking piece 5, a clip 8, a pate spring 9, a locker 13, and a compression coil spring 15. The cover plate 1 has a hole 3 at its lower center. A spring seat 4 is formed on the cover plate 1 at a position above the hole 3, thus seating the coil spring 15 on the cover plate 1. A locking shoulder 2 is formed at each side wall of the cover plate 1. On the other hand, the locking piece 5 has a locking projection 6 which is movably inserted in the hole 3 of the cover plate 1. An extension part 7 is formed at each side portion of the above locking piece 5. The clip 8 is assembled with the back of the cover plate 1, thus forming a housing of the holder. The plate spring 9 has a mount 10 at its top portion, so that the spring 9 is attached to the inside wall of the clip 8 at said mount 10. The lower end of the plate spring 9 is longitudinally slitted at two symmetric positions, thus having one push flap 12 at the center and two locking flaps 11 at both sides. The push flap 12 of the plate spring 9 elastically supports the back of the locking piece 5, thus normally biasing the locking piece 5 in a direction toward the outside of the cover plate 1. On the other hand, the two locking flaps 11 of the plate spring 9 engage with the two locking shoulders 2 of the cover plate 1, respectively. The locker 13, having a slitted and sharpened end 14 at its lower end, is positioned in the holder so as to vertically pass between the cover plate 1 and the two extension parts 7 of the locking piece 5. The locker 13 thus selectively biases the locking projection 6 of the locking piece 5 in a direction toward the inside of the cover plate 1. The compression coil spring 15 is seated between the locker 13 and the seat 4 of the cover plate 1, thus normally biasing the locker 13 upwardly.

When it is necessary to hold a portable phone on the holder, a locking button 16, provided on the portable phone or a phone case, is fitted into a vertical slot of the cover plate 1 from the top to the bottom by pushing the phone downwardly. In such a case, the locking button 16 presses the locking projection 6 of the locking piece 5 rearwardly while the button 16 passes over the projection 6. When the button 16 is finally seated in a predetermined position of the slot of the cover plate 1 with the projection 6 of the locking piece 5 being aligned with a locking slot 17 of the button 16, the locking piece 5 elastically returns to its original position by the pus h flap 12 of the plate spring 9. The locking projection 6 thus holds the locking button 16 and this allows the portable phone to be held on the holder.

In order to remove the portable phone from the holder as desired, the locker 13 is pressed down by a user so as to insert the sharpened end 14 of the locker 13 into between the cover plate 1 and the extension parts 7 of the locking piece 5. In such a case, the sharpened end 14 of the locker 13 biases the extension parts 7 of the locking piece 5 in a direction toward the inside of the cover plate 1. The locking projection 6 of the piece 5 is thus released from the locking slot 17 of the button 16 and this allows the locking button 16 of the portable phone to be removable from the holder.

However, the above holder is problematic in that it necessarily includes two types of springs: a plate spring 9 and a compression coil spring 15 used for respectively biasing the locking piece 5 and the locker 13 so as to allow them to selectively return to their original positions. Such two types of springs 9 and 15 increase the cost of the holder and complicate the process of manufacturing the holder. In addition, the above holder is designed to make the sharpened end 14 of the locker 13 repeatedly push the extension parts 7 of the locking piece 5, so that the extension parts 7, made of synthetic resin, may be undesirably broken, forcing a user to purchase a new holder.

It is also necessary for holders for portable phones to almost completely prevent the locking button 16 of a portable phone from being unexpectedly removed from a holder. That is, the holder must be designed to only allow the locking button 16 of a phone to be removed from the holder when the locking button 16 is released from the locking piece 5 by pressing the locker 13 downwardly.

However, the above-mentioned holder is problematic in that it sometimes fails to safely hold a portable phone, thus allowing the portable phone to be undesirably removed from the holder even when the locker 13 is not operated by a user.

That is, when a user, with a portable phone being held on his waist belt using such a holder, sits on a chair, the lower end of the phone is pressed against the pelvis of the user with the locking button 16 of the phone forcibly pressing the projection 6 of the locking piece 5. Therefore, the locking button 16 may be partially abraded at a position around the locking slot 17 or the front edge of the locking projection 6 may be abraded. This allows the portable phone to be unexpectedly removed from the holder, in which case the phone may be lost. The holder thus sometimes forces a user to purchase a new portable phone.

SUMMARY OF THE INVENTION

Accordingly, the present invention has been made keeping in mind the above problems occurring in the prior art, and an object of the present invention is to provide a belt holder for portable phones, which is designed to allow the locker and the locking piece to be commonly biased by two compression coil springs, thus having a simple construction and reducing the cost, and which only allows the locking button of a portable phone to be removed from the holder when the locker is operated, thus safely holding the portable phone on a waist belt.

In order to accomplish the above object, the present invention provides a belt holder used for holding a locking button of a portable phone or phone case, thus holding the portable phone to a waist belt of a user, comprising: a cover plate having a base wall integrated with a pocket wall, thus having a pocket between the base and pocket walls, the pocket wall being provided with a vertical slot for receiving the locking button, the base wall being provided with both a horizontal guide opening at its middle portion and a side wall along its outside edge, with a guide channel being formed at a top center of the side wall; a clip plate assembled with the cover plate using a plurality of set screws into a housing of the holder, the clip plate being provided with a clip for removably clamping the holder to the waist belt; a locker vertically and movably set in the holder at a position between the cover plate and the clip plate with both a lower portion of the locker being positioned in a gap between the cover plate and the clip plate and an upper portion of the locker being exposed outside the guide channel of the cover plate, the locker having two inclined guide portions at both side edges thereof with the two inclined guide portions being converged downwardly; two locking pieces symmetrically and movably seated in the horizontal guide opening of the cover plate so as to be horizontally and oppositely movable in the guide opening, each of the locking pieces having both a pressure part exposed into the pocket of the cover plate and a restoring part exposed into the gap between the cover plate and the clip plate, the pressure part having a first slope surface cooperating with the locking button, and the restoring part having a second slope surface cooperating with an associated inclined guide portion of the locker; and a coil spring positioned between the side wall of the cover plate and each of the two locking pieces, thus normally biasing the two locking pieces to each other.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 2:
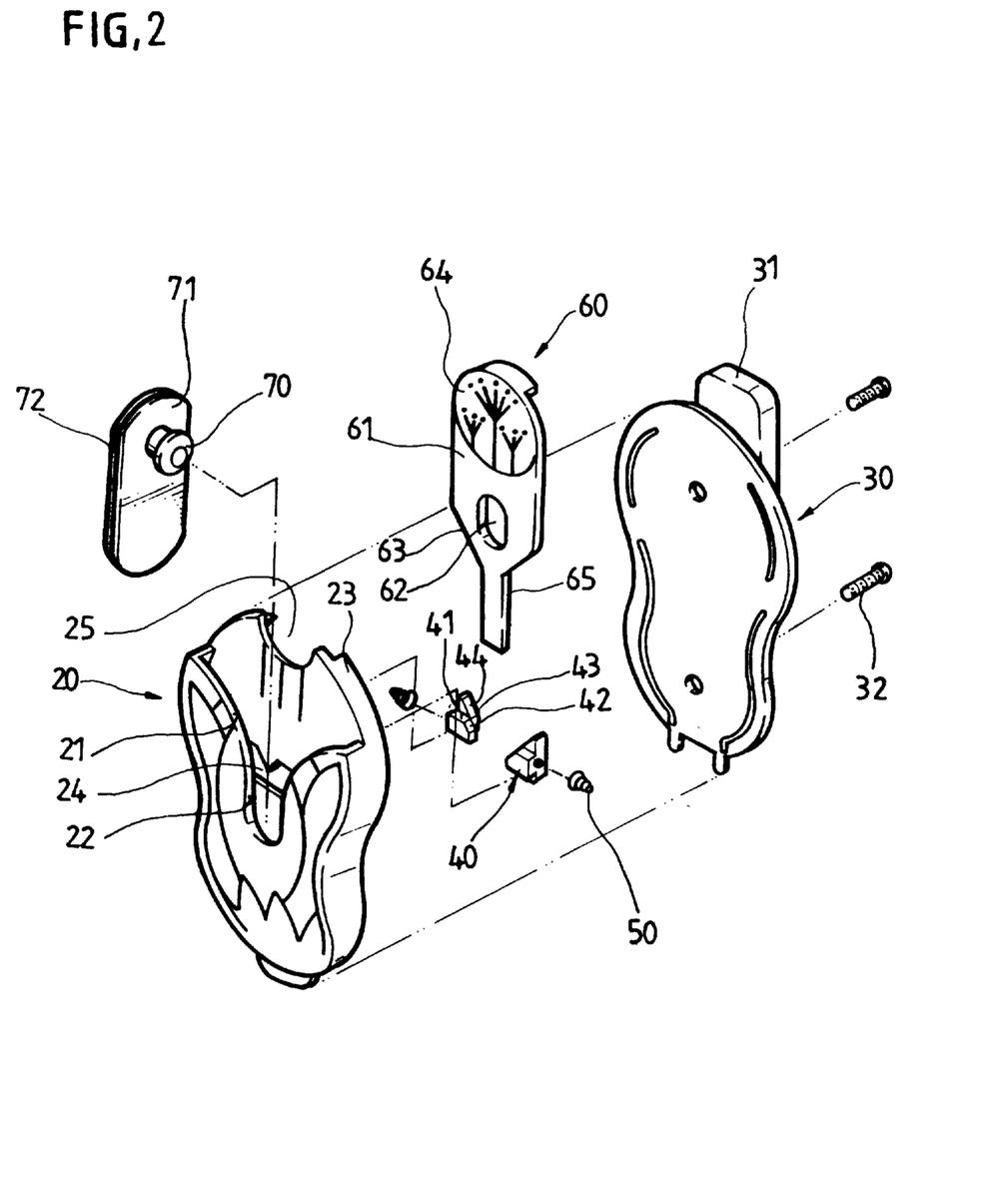
FIG. 2 is an exploded perspective view, showing the construction of a belt holder for portable phones in accordance with the preferred embodiment of the present invention.
Figure 3:
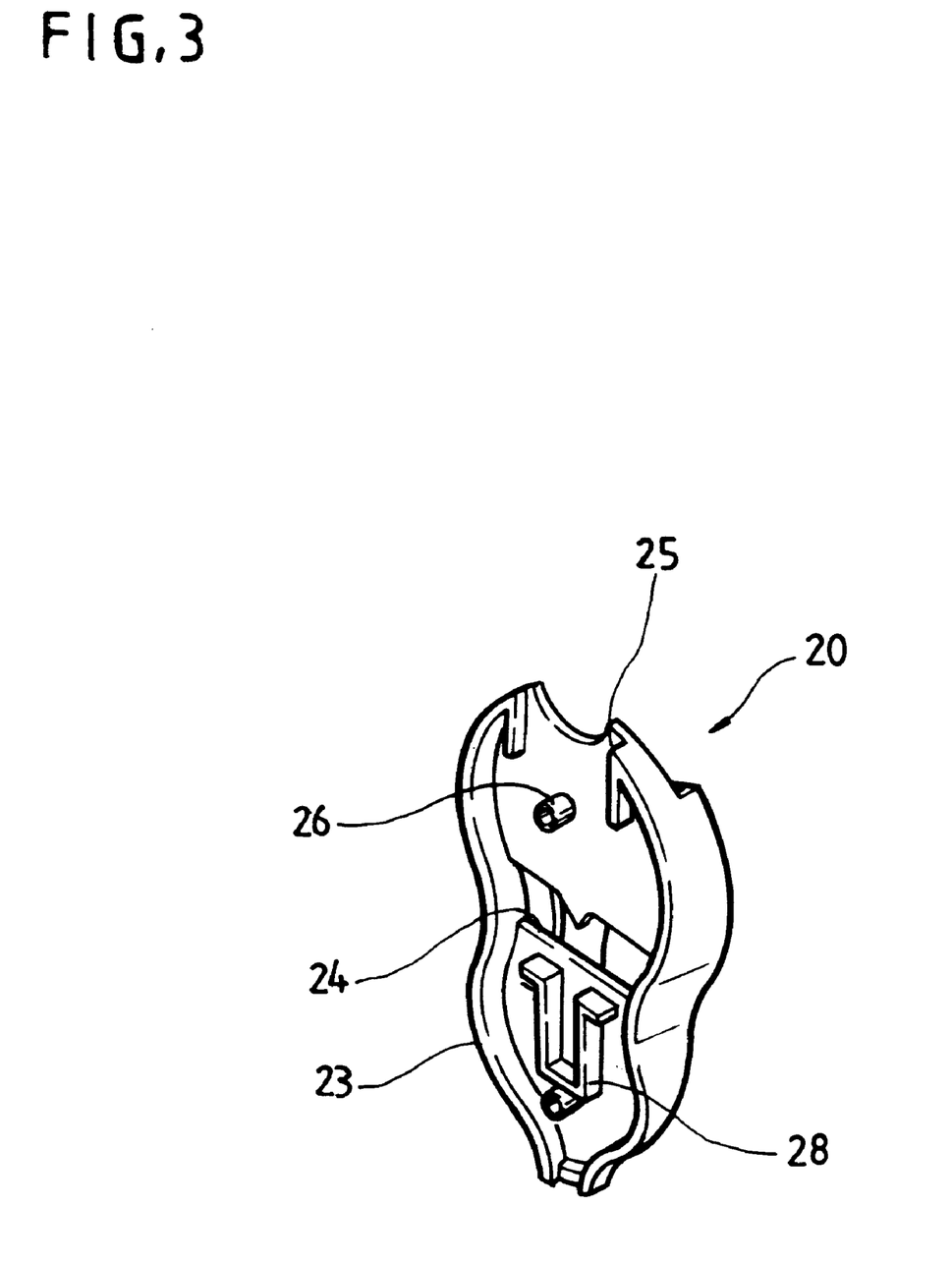
FIG. 3 is a rear perspective view of a cover plate of the holder of FIG. 2.
Figure 4A:
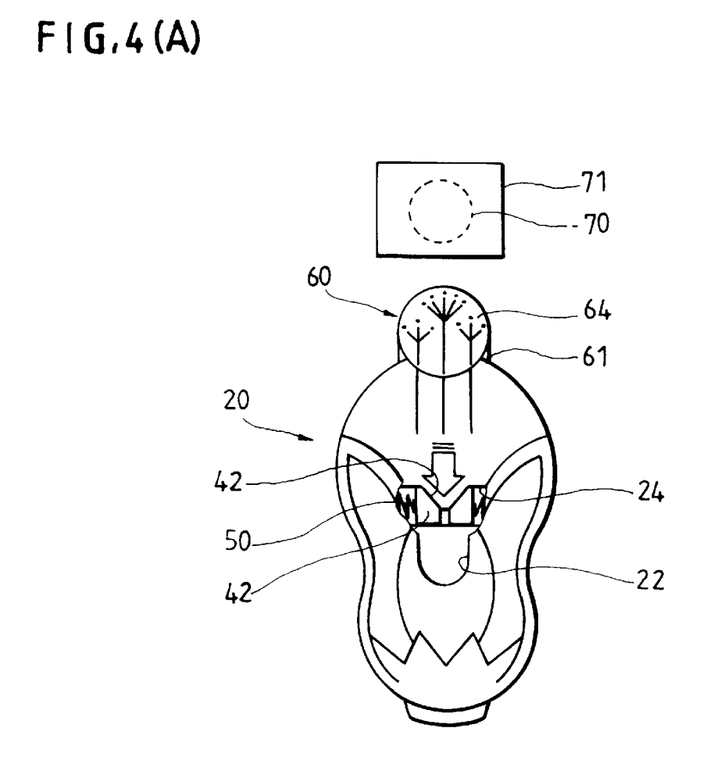
FIGS. 4A and 4B are front and rear views of the holder of FIG. 2, respectively, with the holder being free from any portable phone.
Figure 4B:
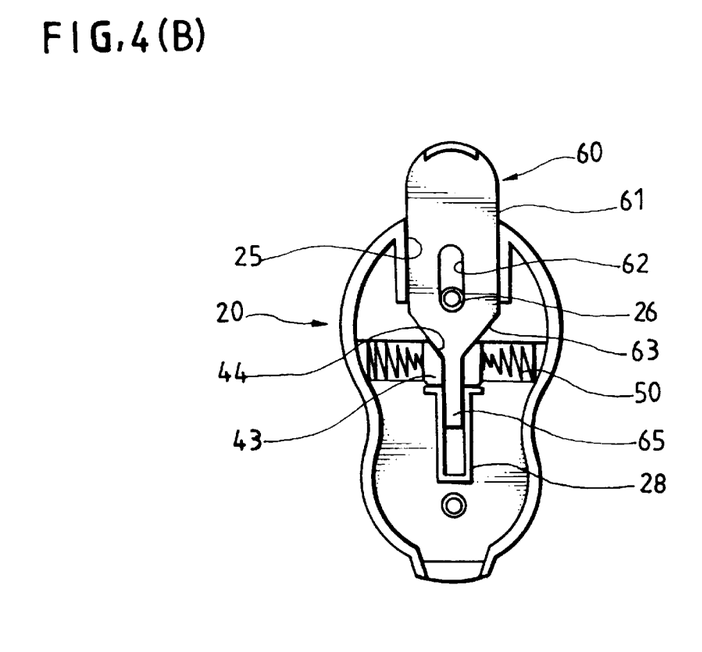
Figure 5:
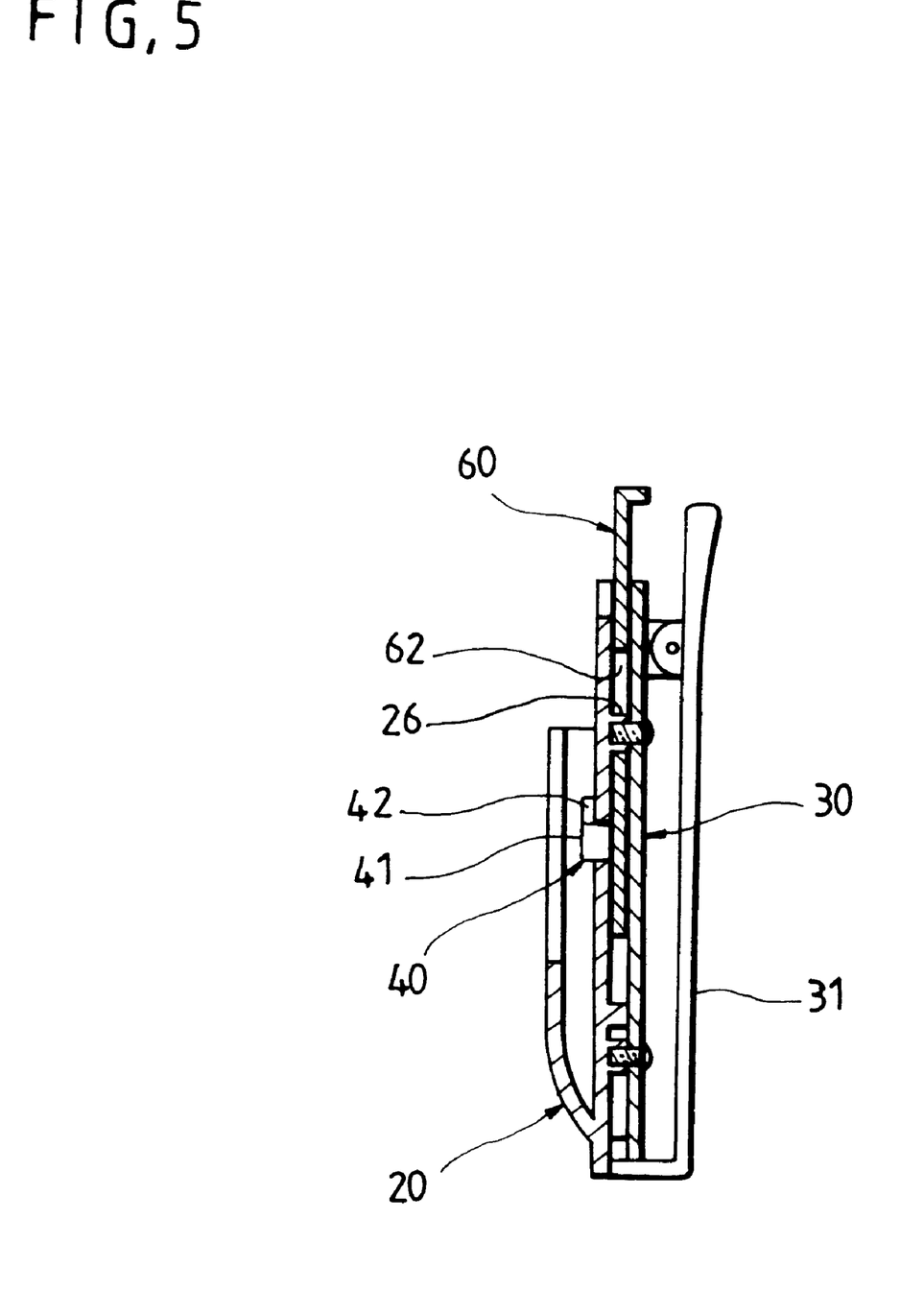
FIG. 5 is a sectional view of the holder of FIGS. 4A and 4B.
Figure 6A:
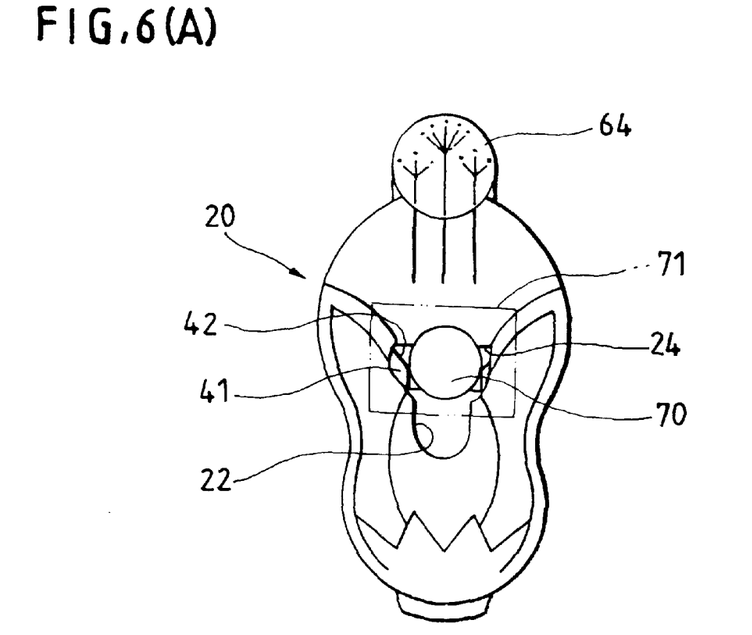
FIGS. 6A and 6B are front and rear views of the holder of FIG. 2, respectively, with a locking button of a portable phone being held on the holder.
Figure 6B:
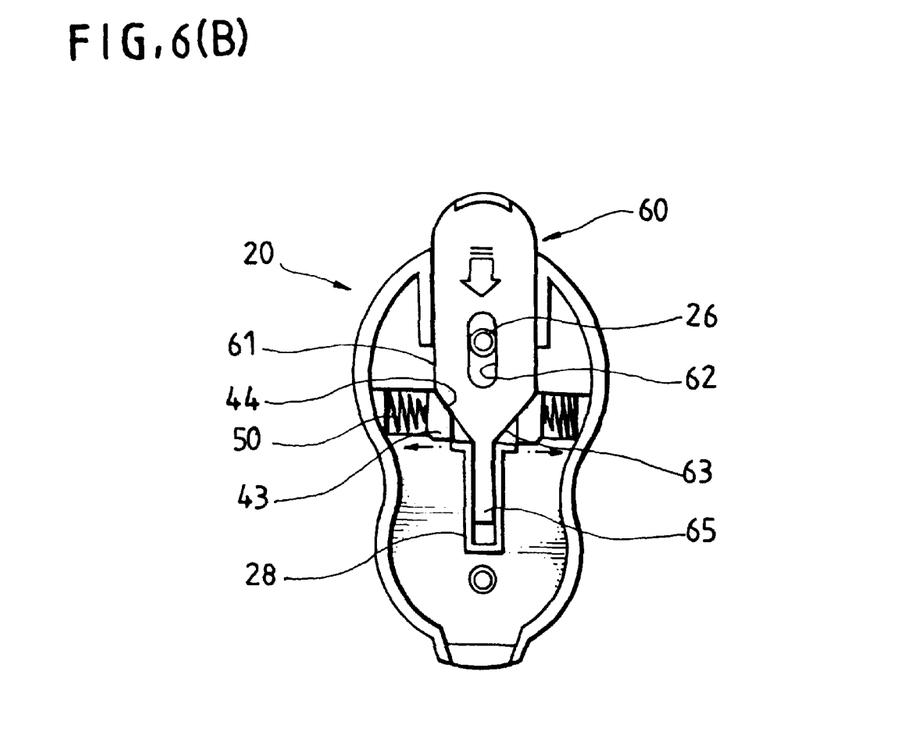

FIG. 2 is an exploded perspective view, showing the construction of a belt holder for portable phones in accordance with the preferred embodiment of the present invention. FIG. 3 is a rear perspective view of a cover plate of the above holder. FIGS. 4A and 4B are front and rear views of the above holder, respectively, with the holder being free from any portable phone. FIG. 5 is a sectional view of the above holder. FIGS. 6A and 6B are front and rear views of the above holder, respectively, with a locking button of a portable phone being held on the holder.

Referring first to FIGS. 2 to 5, the belt holder of this invention comprises a cover plate 20, a clip plate 30, two locking pieces 40, two compression coil springs 50, and a locker 60. The cover plate 20, assembled with the clip plate 30 into a housing of the holder, has a horizontal guide opening 24 at a middle portion of its base wall. The two locking pieces 40 are symmetrically and movably seated in the guide opening 24 of the cover plate 20, thus being horizontally movable under the guide of the opening 24. The two compression coil springs 50 are positioned to normally bias the two locking pieces 40 inwardly, thus normally making the two pieces 40 retained at a locking position. On the other hand, the locker 60 is movably set in the holder, with the lower portion of the locker 60 being vertically movable in the gap between the cover plate 20 and the clip plate 30. The locker 60 thus selectively biases the two locking pieces 40 outwardly while overcoming the spring force of the two coil springs 50.

The cover plate 20 has a pocket wall 21, thus forming a pocket between the base wall and the pocket wall 21. The above pocket wall 21 is provided with a vertical slot 22 for receiving a locking button 70 of a portable phone. The guide opening 24 is horizontally formed at the middle portion of the base wall of the cover plate 20. A side wall 23 is formed along the outside edge of the base wall of said cover plate 20.

As best seen in FIG. 3, the rear surface of the cover plate 20 has a guide channel 25, a guide projection 26, and a guide seat 28. The above guide channel 25 is formed at the top center of the side wall 23, while the guide projection 26 is formed at a position above the center of the guide opening 24. The above guide projection 26 engages with a longitudinal hole 62 of the locker 60 as will be described in detail later herein. The above projection 26 thus maintains a vertically movable position of the locker 60 relative to the cover plate 20. That is, the guide projection 26 restricts an undesirable lateral movement of the locker 60 in the holder. The guide seat 28 is provided at a position under the guide opening 24 so as to guide a movement of a lower extension 65 of the locker 60 while preventing the extension 65 from laterally moving in the holder.

The above cover plate 20 is assembled with the clip plate 30 using a plurality of set screws 32. The above clip plate 30 has a profile corresponding to that of the cover plate 20. A clip 31 is pinned to the top center portion of the clip plate 30 at a surface opposite to the cover plate 20, thus being hinged to the plate 30. The above clip 31 is also biased by a torsion spring (not shown), so that the clip 31 allows the holder to be firmly clamped to a waist belt of a user. When assembling the cover plate 20 with the clip plate 30 into a single body, the cover plate 20 is primarily positioned on the plate 20 with the side wall 23 of the cover plate 20 being positioned along the outside edge of the clip plate 30. Thereafter, the plate 30 is screwed to the cover plate 20 using the set screws 32.

The locker 60 comprises a flat body 61 with a pressure part 64 being formed at the top portion of the body 61. The above-mentioned longitudinal hole 62 is formed at the middle portion of the body 61. The lower extension 65 longitudinally extends downwardly at the lower end of the flat body 61. Each side edge of the flat body 61 is partially cut inclinedly at the corner just above the extension 62, thus having an inclined guide portion 63. The two inclined guide portions 63 of the locker 60 are converged downwardly.

The above locker 60 is vertically and movably set in the holder at a position between the cover plate 20 and the clip plate 30, with the lower portion of the locker 60 being positioned in the holder and the upper portion of the locker 60 being exposed to the top of the holder outside the guide channel 25 of the cover plate 20.

The two locking pieces 40 are symmetrically and movably seated in the guide opening 24 of the cover plate 20 in a way such that the two pieces 40 are opposite to each other. Each of the two locking pieces 40 comprises a specifically designed block with two parts: a pressure part 41 and a restoring part 43. The pressure part 41 has a first slope surface 42 at its top end, while the restoring part 43 has a second slope surface 44 at its top end.

The above pressure part 41 is integrated with the restoring part 43 into a single block. In such a case, the height of the pressure part 41 is equal to the width of the horizontal guide opening 24 of the cover plate 20, while the height of the restoring part 43 is slightly lower than that of the pressure part 41.

The two locking pieces 40 are symmetrically set in the guide opening 24 in a way such that the front surface of the pressure part 41 of each piece 40 is exposed into the pocket outside the base wall of the cover plate 20 and the top and bottom edges of the restoring part 43 are respectively brought into close and slidable contact with the upper and lower edges of the opening 24. In such a case, the restoring part 43 of each locking piece 40 is partially exposed into the gap between the cover plate 20 and the clip plate 30, thus being operated in conjunction with the locker 60 as will be described later herein.

When the two locking pieces 40 are set in the guide opening 24 of the cover plate 20 as described above, the first slope surfaces 42 of the two locking pieces 40 cooperate with the opposite sides of the locking button 70 which moves along the vertical slot 22 of the cover plate 20. Meanwhile, the second slope surfaces 44 of the two pieces 40 are operable in conjunction with both inclined guide portions 63 of the locker 60.

Each of the two compression coil springs 50 is positioned between an associated locking piece 40 and the side wall 23 of the cover plate 20. The two coil springs 50 thus normally bias the two locking pieces 40 inwardly.

In the drawings, the reference numeral 71 denotes a mount plate to which the locking button 70 is mounted. The reference numeral 72 denotes a releasable sheet, which is removably attached to the adhesive back surface of the mount plate 71. In order to attach the mount plate 71 to a portable phone or a phone case, the releasable sheet 72 is removed from the plate 71 prior to attaching the plate 71 to the phone or phone case.

FIGS. 4A and 4B show the belt holder of this invention in a normal position where the holder is free from any locking button 70. In such a case, the two locking pieces 40 are biased by the two compression coil springs 50 inwardly, so that the two pieces 40 are brought into contact with each other. In addition, the two locking pieces 40 bias the inclined guide portions 63 of the locker 60 upwardly by the second slope surfaces 44 of their restoring parts 43. The locker 60 is thus elastically biased upwardly and is maintained at its top position.

When the locking button 70 of a portable phone is fitted into the vertical slot 22 of the cover plate's pocket wall 21 downwardly, the button 70 primarily comes into contact with the first slope surfaces 42 of the two locking pieces 40. When the button 70 is further moved in the slot 22 downwardly, the button 70 pushes the first slope surfaces 42 of the two locking pieces 40, thus biasing the two pieces 40 outwardly as shown in FIGS. 6A and 6B. The two locking pieces 40 are thus moved away from each other. The locking button 70 is, thereafter, positioned between the pressure parts 41 of the two locking pieces 40. In such a case, the two compression coil springs 50 are fully compressed, while the locker 60 moves downwardly due to its own weight.

When the button 70 is further moved in the slot 22 downwardly, the button 70 completely passes over the two locking pieces 40 and is finally positioned in the bottom of the slot 22. In such a case, the two locking pieces 40 elastically return to their original positions due to the restoring force of the two compression coil springs 50. In addition, the second slope surfaces 44 of the two locking pieces 40 push the inclined guide portions 63 of the locker 60 upwardly, thus elastically moving the locker 60 to its top position of FIGS. 4A and 4B.

When it is necessary to remove the locking button 70 from the holder in order to use the phone, the locker 60 has to be primarily pushed downwardly by operating the pressure part 64 of the locker 60. When the locker 60 is pushed downwardly as described above, the inclined guide portions 63 of the locker 60 push the second slope surfaces 44 of the two locking pieces 40 outwardly, thus moving the two pieces 40 away from each other as shown in FIGS. 6A and 6B. It is thus possible to remove the locking button 70 from the slot 22 of the holder.

Since the longitudinal hole 62 of the locker 60 engages with the guide projection 26 of the cover plate 20, the locker 60 is prevented from being unexpectedly removed from the holder when the locker 60 is biased upwardly by the two locking pieces 40. In addition, the lower extension 65 of the locker 60 is restricted from any lateral movement since both sides of the extension 65 are movably guided by the guide seat 28 of the cover plate 20.

The holder of this invention almost completely prevents the locking button 70 of a portable phone from being unexpectedly removed from the holder. That is, when the locking button 70 of the phone is forcibly and undesirably thrust upwardly in the slot 22 of the holder with the two locking pieces 40 being not unlocked, the locking button 70 is stopped by the bottom edges of the pressure parts 41 of the two locking pieces 40, so that it is impossible for the locking button 70 to be unexpectedly removed from the holder.

Therefore, the holder of this invention only allows the locking button 70 of a portable phone to be removed from the holder when the two locking pieces 40 are unlocked by operating the locker 60. The locking button 70 is generally made of plastic materials. However, in order to enhance a durability thereof, steel or aluminium etc, may be used in this invention.

The holder of this invention thus almost completely overcomes the problem experienced in the Lypical holder of FIG. 1. That is, in comparison with the typical holder, which may allow the locking button of a portable phone to be unexpectedly removed from the holder when the phone is undesirably thrust upwardly by the pelvis of a user with the locking slot of the locking button or the locking projection of the locking piece being abraded, the holder of this invention almost completely prevents the locking button from being unexpectedly removed from the holder.

In the holder of this invention, both the locker 60 and the two locking pieces 40 are commonly biased by two compression coil springs 50, thus reducing the cost of the holder and simplifying the process of manufacturing the holder in comparison with the typical holder having two types of springs: a plate spring 9 and a coil spring 15.

In addition, it should be understood that the configuration of the pressure part 64 of the locker 60 is not limited to that designed in the preferred embodiment. For example, the configuration of the pressure part 64 may be somewhat freely changed as desired.

As described above, the present invention provides a belt holder for portable phones. In the holder of this invention, both the locker and the locking pieces are commonly biased by one type of elastic members or two compression coil springs, thus reducing the cost of the holder and simplifying the process of manufacturing the holder in comparison with a typical holder having two types of springs: a plate spring and a coil spring. In addition, the holder of this invention reliably stops the locking button of a portable phone by the two locking pieces, so that the holder only allows the locking button to be removed from the holder when the locker is operated by a user, thus safely holding the portable phone on a waist belt.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A belt holder used for holding a locking button of a portable phone or phone case, thus holding the portable phone to a waist belt of a user, comprising:

a cover plate having a base wall integrated with a pocket wall, thus having a pocket between the base and pocket wall, said pocket wall being provided with a vertical slot for receiving the locking button, said base wall being provided with both a horizontal guide opening at its middle portion and a side wall along its outside edge, with a guide channel being formed at a top center of said side wall;

a clip plate assembled with said cover plate using a plurality of set screws into a housing of the holder, said clip plate being provided with a clip for removably clamping the holder to the waist belt;

a locker vertically and movably set in the holder at a position between the cover plate and the clip plate with both a lower portion of the locker being positioned in a gap between the cover plate and the clip plate and an upper portion of the locker being exposed outside the guide channel of the cover plate, said locker having two inclined guide portions at both side edges thereof with the two inclined guide portions being converged downwardly;

two locking pieces symmetrically and movably seated in said horizontal guide opening of the cover plate so as to be horizontally and oppositely movable in the guide opening, each of said locking pieces having both a pressure part exposed into the pocket of the cover plate and a restoring part exposed into the gap between the cover plate and the clip plate, said pressure part having a first slope surface cooperating with the locking button, and said restoring part having a second slope surface cooperating with an associated inclined guide portion of the locker; and a coil spring positioned between the side wall of the cover plate and each of the two locking pieces, thus normally biasing the two locking pieces to each other.

* * * * *